(12) United States Patent
Nemoto

(10) Patent No.: US 10,175,611 B2
(45) Date of Patent: Jan. 8, 2019

(54) TONER CONVEYANCE DEVICE AND IMAGE FORMING APPARATUS INCLUDING THE SAME

(71) Applicant: KYOCERA Document Solutions Inc., Osaka (JP)

(72) Inventor: Shinji Nemoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/921,803

(22) Filed: Mar. 15, 2018

(65) Prior Publication Data

US 2018/0275562 A1 Sep. 27, 2018

(30) Foreign Application Priority Data

Mar. 23, 2017 (JP) .................. 2017-058076

(51) Int. Cl.
| | |
|---|---|
| *B65G 33/22* | (2006.01) |
| *B65G 33/30* | (2006.01) |
| *B65G 33/32* | (2006.01) |
| *G03G 15/08* | (2006.01) |
| *G03G 15/16* | (2006.01) |
| *G03G 21/10* | (2006.01) |

(52) U.S. Cl.
CPC ......... *G03G 15/0891* (2013.01); *B65G 33/22* (2013.01); *B65G 33/30* (2013.01); *B65G 33/32* (2013.01); *G03G 15/161* (2013.01); *G03G 21/105* (2013.01); *G03G 2215/0802* (2013.01); *G03G 2221/0005* (2013.01)

(58) Field of Classification Search
CPC ............. G03G 15/0891; G03G 15/161; G03G 21/105; G03G 2215/0802; G03G 2221/0005; B65G 33/14; B65G 33/22; B65G 33/30; B65G 33/32
USPC ......................................... 198/662, 669, 676
See application file for complete search history.

(56) References Cited

U.S. PATENT DOCUMENTS

| | | | | |
|---|---|---|---|---|
| 3,232,419 A | * | 2/1966 | Rasmussen | ........... B24C 7/0092 198/661 |
| 2008/0170887 A1 | * | 7/2008 | Nishimura | ......... G03G 15/0896 399/262 |
| 2014/0076691 A1 | * | 3/2014 | Yamada | ............. G03G 15/0189 198/548 |

(Continued)

FOREIGN PATENT DOCUMENTS

JP 2016-12149 1/2016

*Primary Examiner* — Mark A Deuble
(74) *Attorney, Agent, or Firm* — Wenderoth, Lind & Ponack, L.L.P.

(57) ABSTRACT

A toner conveyance device includes a conveying screw having a shaft and a spiral blade. The spiral blade includes a start end-side blade adjacent to a bearing positioned at a start end part side in a toner conveyance path, a terminal-side blade adjacent to a bearing positioned at a terminal part side, and an intermediate blade. A toner discharge port is provided between the intermediate blade and the terminal-side blade. A spiral winding direction of the terminal-side blade is opposite to that of the intermediate blade, a spiral winding direction of the start end-side blade is equal to that of the intermediate blade, and a blade diameter of the start end-side blade and a blade diameter of the terminal-side blade are smaller than that of the intermediate blade.

6 Claims, 6 Drawing Sheets

Start end side ◄─────► Terminal side

(56) References Cited

U.S. PATENT DOCUMENTS

2015/0096868 A1* 4/2015 Mizuno ............... B65G 33/34
198/674

* cited by examiner

Start end side ⟷ Terminal side

Start end side ←——→ Terminal side

TONER CONVEYANCE DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-058076 filed on Mar. 23, 2017, the entire contents of which are incorporated herein by reference.

BACKGROUND

The technology of the present disclosure relates to a toner conveyance device and an image forming apparatus including the same.

In general, an electrophotographic image forming apparatus and the like are installed with a toner conveyance device for conveying toner in a predetermined direction. The toner conveyance device, for example, is used in order to convey toner to be supplied to an image forming unit or convey toner on an intermediate transfer belt, which has been collected by a cleaning device.

The aforementioned toner conveyance device includes a casing in which a toner conveyance path is formed, and a conveying screw that conveys toner in a prescribed direction by rotating in the toner conveyance path.

The aforementioned conveying screw has a shaft and a spiral blade protruding from an outer peripheral surface of the shaft. Both end parts of the shaft of the conveying screw are supported by a pair of bearings. The conveying screw is provided at the shaft thereof with a flange member for preventing toner from infiltrating into the bearings. The flange member is provided between the bearings and the blade.

SUMMARY

A toner conveyance device according to one aspect of the present disclosure includes a casing, a pair of bearings, and a conveying screw. The casing forms a toner conveyance path therein. The casing has a toner discharge port opened downward at a position near a terminal part of the toner conveyance path. The conveying screw includes a shaft and a spiral blade. Both ends of the shaft are supported by the aforementioned pair of bearings. The spiral blade protrudes from a peripheral surface of the shaft in a spiral shape. The spiral blade conveys toner in the toner conveyance path from a start end part to the terminal part of the toner conveyance path by rotating in a predetermined direction.

The spiral blade includes a start end-side blade, a terminal-side blade, and an intermediate blade. The start end-side blade is adjacent to the bearing positioned at a start end side in the toner conveyance path. The terminal-side blade is adjacent to the bearing positioned at a terminal part side in the toner conveyance path. The intermediate blade is formed between the aforementioned start end-side blade and the aforementioned terminal-side blade.

The toner discharge port is provided between the aforementioned intermediate blade and the aforementioned terminal-side blade. A spiral winding direction of the terminal-side blade is opposite to a spiral winding direction of the intermediate blade. A spiral winding direction of the start end-side blade is equal to the spiral winding direction of the intermediate blade. A blade diameter of the start end-side blade and a blade diameter of the terminal-side blade are smaller than a blade diameter of the intermediate blade.

An image forming apparatus of the present disclosure includes the aforementioned toner conveyance device.

DETAILED DESCRIPTION

Hereinafter, an example of embodiments will be described in detail on the basis of the drawings. It is noted that the technology of the present disclosure is not limited to the following embodiments.

Embodiment 1

Figure 1:
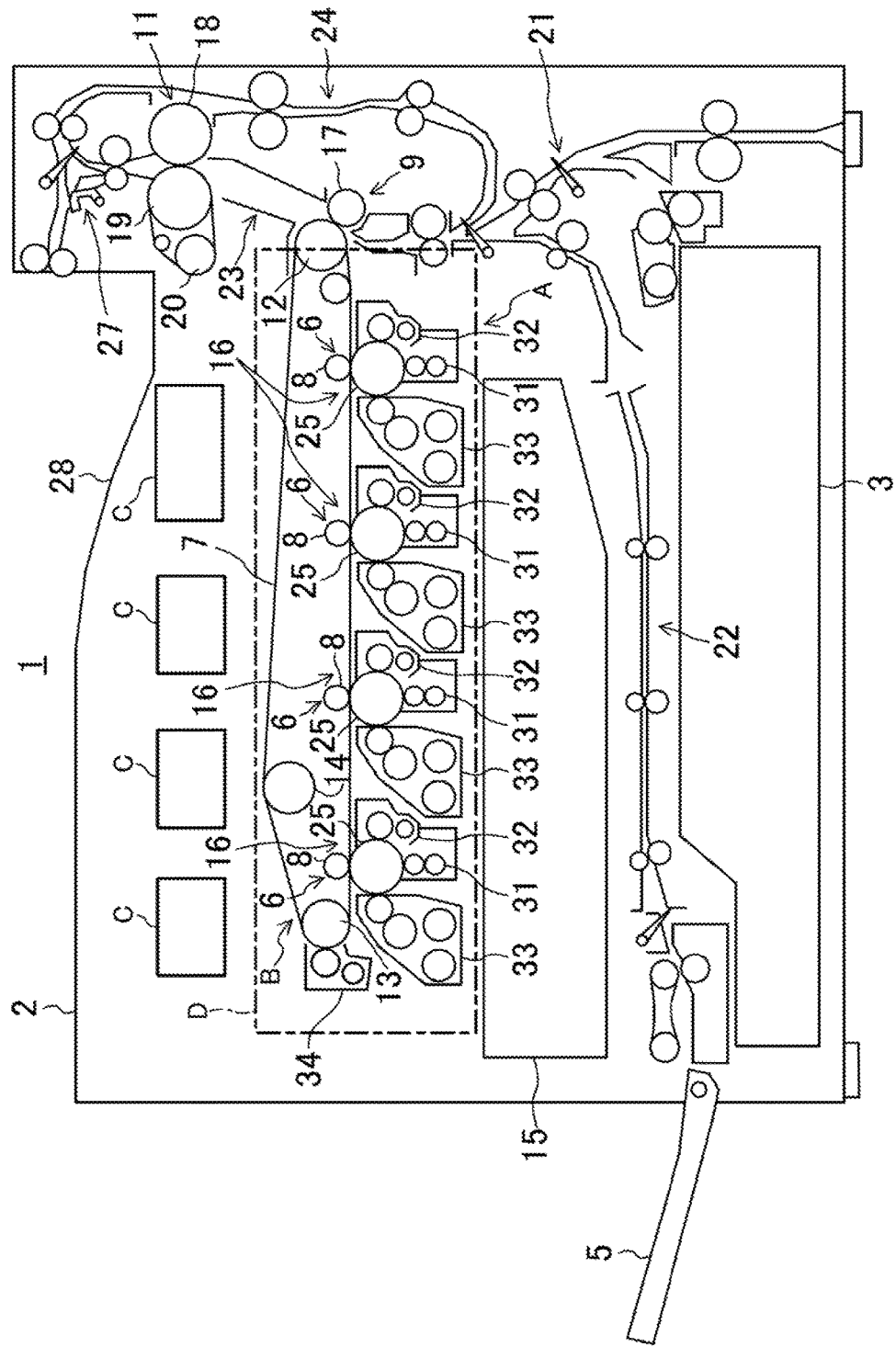
FIG. 1 is a schematic configuration diagram illustrating an image forming apparatus including a toner conveyance device in an embodiment.

FIG. 1 illustrates a schematic diagram illustrating an overall configuration of an image forming apparatus 1 including a toner conveyance device 100 in an embodiment. The image forming apparatus 1, for example, is a tandem type color printer and includes a development unit A, an intermediate transfer unit B arranged above the development unit A, and a plurality of (four) toner containers C arranged above the intermediate transfer unit B. Toner in the toner containers C, for example, is low melt toner having a melting point equal or less than 140°. The image forming apparatus 1 further includes primary transfer units 6, a secondary transfer unit 9, a fixing unit 11, and an optical scanning device 15. The development unit A has a plurality of (four) image forming units 16 arranged above the optical scanning device 15. The intermediate transfer unit B has an endless intermediate transfer belt (an intermediate transfer body) 7, wherein the intermediate transfer belt 7 is arranged above the four image forming units 16 along the arrangement direction of the image farming units 16.

At an internal lower part of an apparatus body 2 of the image forming apparatus 1, a sheet feeding cassette 3 is arranged. In the sheet feeding cassette 3, sheets (not illustrated) before printing are stacked and accommodated. The sheet feeding cassette 3 is provided at a lateral side thereof with a first sheet conveyance part 21. The first sheet conveyance part 21 receives sheets sent from the sheet feeding cassette 3 and conveys the sheets to the upper secondary transfer unit 9.

At a lateral side of the sheet feeding cassette 3 opposite to the first sheet conveyance part 21, a manual sheet feeding unit 5 is provided. Between the manual sheet feeding unit 5 and the first sheet conveyance part 21, a second sheet conveyance part 22 is provided. The second sheet conveyance part 22 receives sheets sent from the manual sheet feeding unit 5 and conveys the sheets to the first sheet conveyance part 21.

The optical scanning device 15 is arranged above the second sheet conveyance part 22, and irradiates laser light to the image forming units 16 on the basis of image data received in the image forming apparatus 1. The intermediate transfer belt 7 is wound around a driving roller 12 and a driven roller 13, and is rotationally driven by a driving device (not illustrated). A reference numeral 14 indicates a tension roller.

The intermediate transfer belt 7 is configured to abut outer peripheral surfaces of a plurality of photosensitive drums (image carrying members) 25, so that toner images are transferred from the outer peripheral surfaces of the plurality of photosensitive drums 25.

The four image forming units 16 are arranged in a row along the intermediate transfer belt 7, and respectively form yellow, magenta, cyan, and black toner images. Each of the image forming units 16 has the photosensitive drum 25, an electrifier 31 arranged around the photosensitive drum 25, a developing unit 33, and a photoreceptor cleaning device 32.

The electrifier 31 electrifies the surface of the photosensitive drum 25. On the photosensitive drum 25 electrified by the electrifier 31, an electrostatic latent image is formed by the laser light irradiated from the optical scanning device 15. The developing unit 33 forms a toner image on the surface of the photosensitive drum 25 by developing the electrostatic latent image.

The primary transfer units 6 are arranged above the image forming units 16, respectively. Each of the primary transfer units 6 has a transfer roller 8 that primarily transfers the toner image formed on the photosensitive drum 25 by the image forming unit 16 to the surface of the intermediate transfer belt 7.

Due to the rotational driving of the intermediate transfer belt 7 and a voltage having a polarity opposite to that of toner applied to the transfer roller 8, the toner image on each photosensitive drum 25 is transferred to the intermediate transfer belt 7 at a predetermined timing. In this way, a color toner image, in which toner images of four colors of yellow, magenta, cyan, and black are superposed, is formed on the surface of the intermediate transfer belt 7. Furthermore, after the toner images are transferred to the intermediate transfer belt 7, the surface of the photosensitive drum 25 is cleaned by the photoreceptor cleaning device 32.

The secondary transfer unit 9 has a second transfer roller 17 arranged at a lateral side of the intermediate transfer belt 7. The secondary transfer unit 9 transfers the toner image on the intermediate transfer belt 7 to a sheet, which is sent from the first sheet conveyance part 21, by a voltage having a polarity opposite to that of toner applied to the second transfer roller 17.

At a lateral side of the driven roller 13 of the intermediate transfer belt 7, which is opposite to the secondary transfer unit 9, a cleaning device 34 is arranged in order to clean the surface of the intermediate transfer belt 7.

The fixing unit 11 is arranged above the secondary transfer unit 9. Between the secondary transfer unit 9 and the fixing unit 11, a third sheet conveyance part 23 is formed to convey a sheet with the secondary transferred toner image to the fixing unit 11. The fixing unit 11 includes a pressure roller 18, a fixing roller 19, and a heating roller 20. The fixing unit 11 heats and presses the sheet conveyed from the third sheet conveyance part 23, thereby fixing the toner image to the sheet.

Above the fixing unit 11, a branch part 27 is provided. The sheet discharged from the fixing unit 11 is discharged from the branch part 27 to a sheet discharge unit 28 formed at an upper part of the image forming apparatus 1 when duplex printing is not performed. When the duplex printing is performed, the sheet is conveyed again from the branch part 27 to the secondary transfer unit 9 via a fourth sheet conveyance part 24.

At a front side of the intermediate transfer unit B, an inner unit D is arranged so as to cover the front surface of the intermediate transfer unit B (see a dashed line), so that toner is supplied from the toner containers C to the developing units 33 of the development unit A via the inner unit D.

Figure 2:
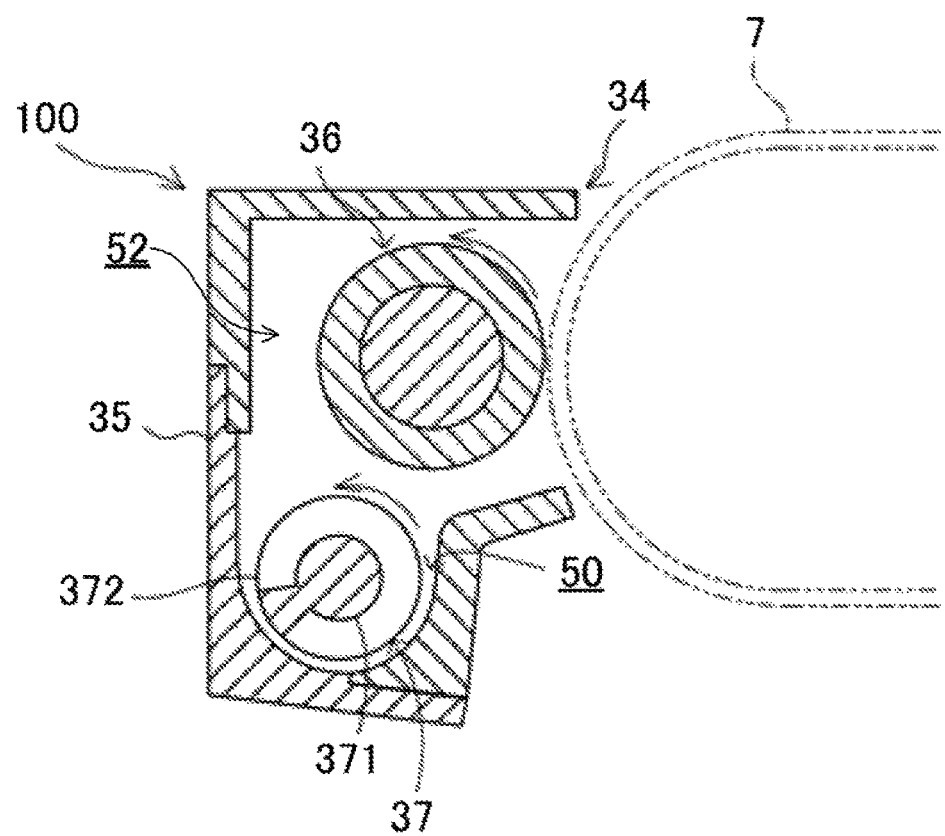
FIG. 2 is a sectional view of a belt cleaning device including a toner conveyance device.
Figure 3A:
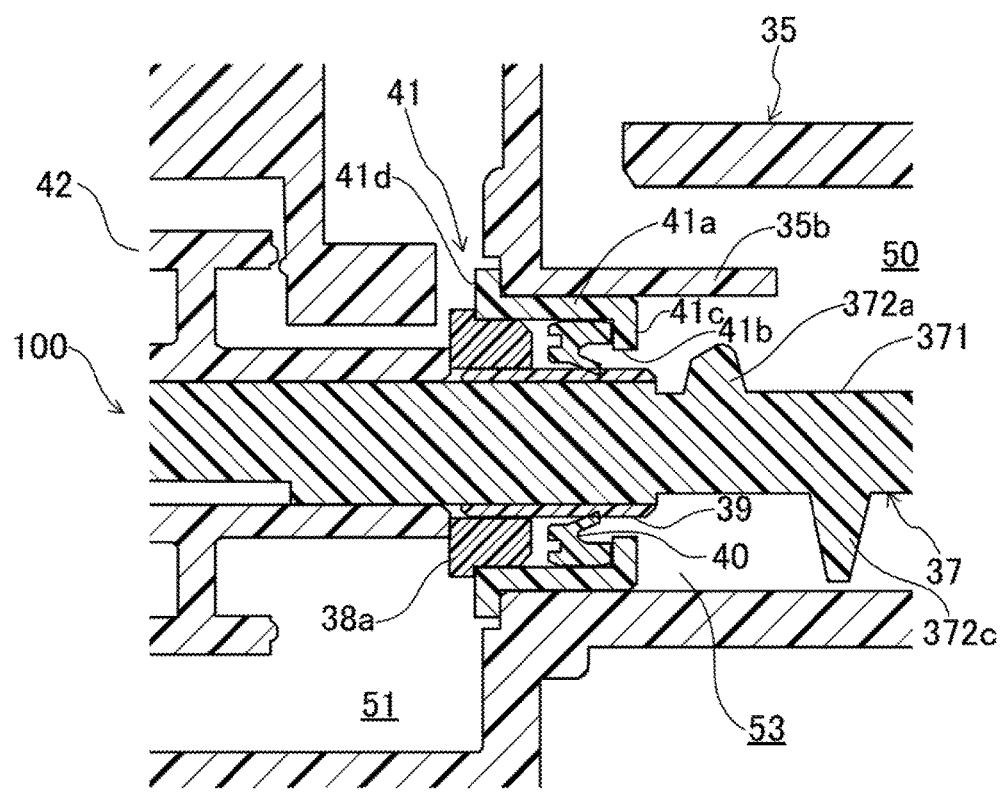
FIG. 3A is a longitudinal sectional view of a toner conveyance device and an enlarged view of a start end part side of the toner conveyance device.
Figure 3B:
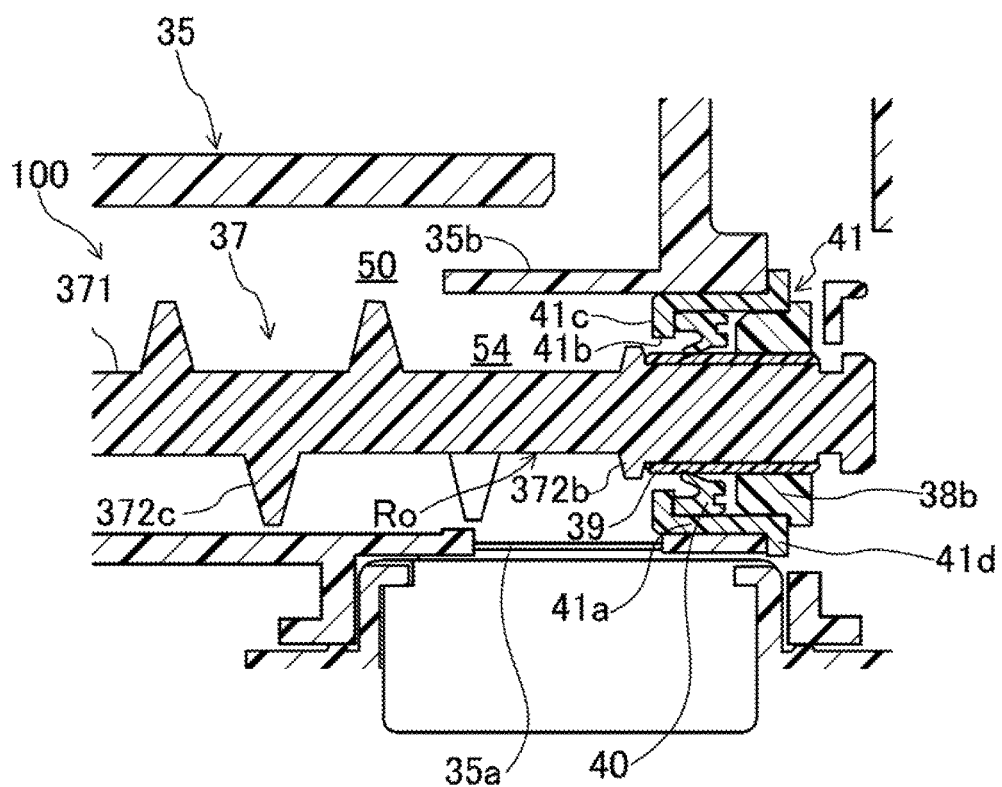
FIG. 3B is a longitudinal sectional view of a toner conveyance device and an enlarged view of a terminal part side of the toner conveyance device.
Figure 4:
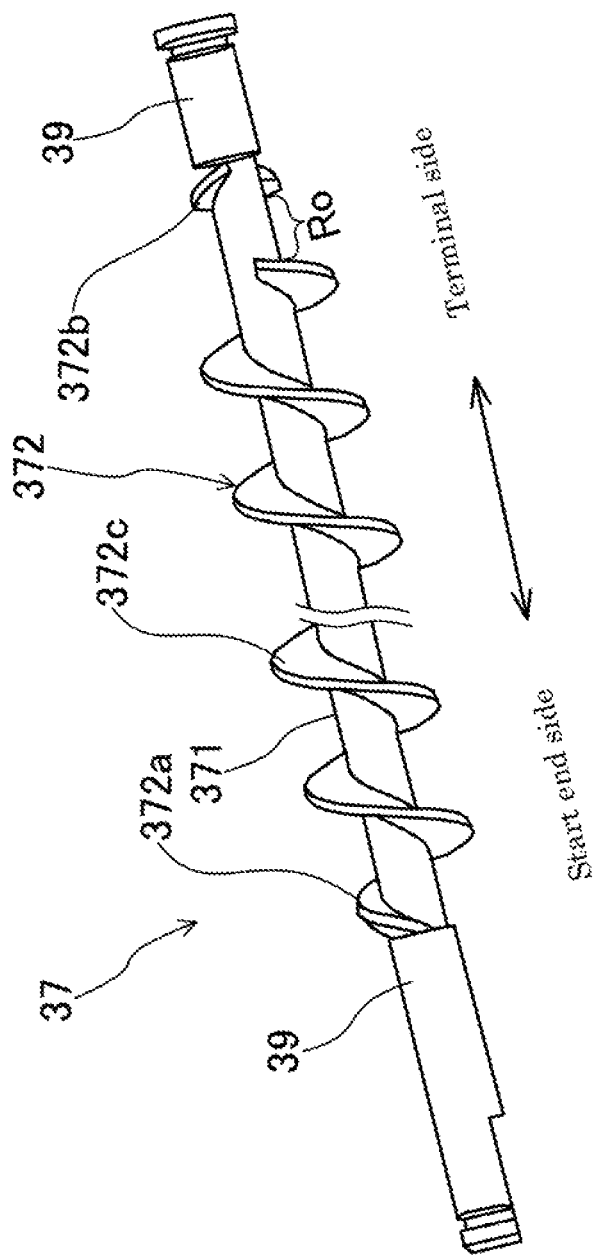
FIG. 4 is a perspective view illustrating a toner conveying screw.
Figure 5:
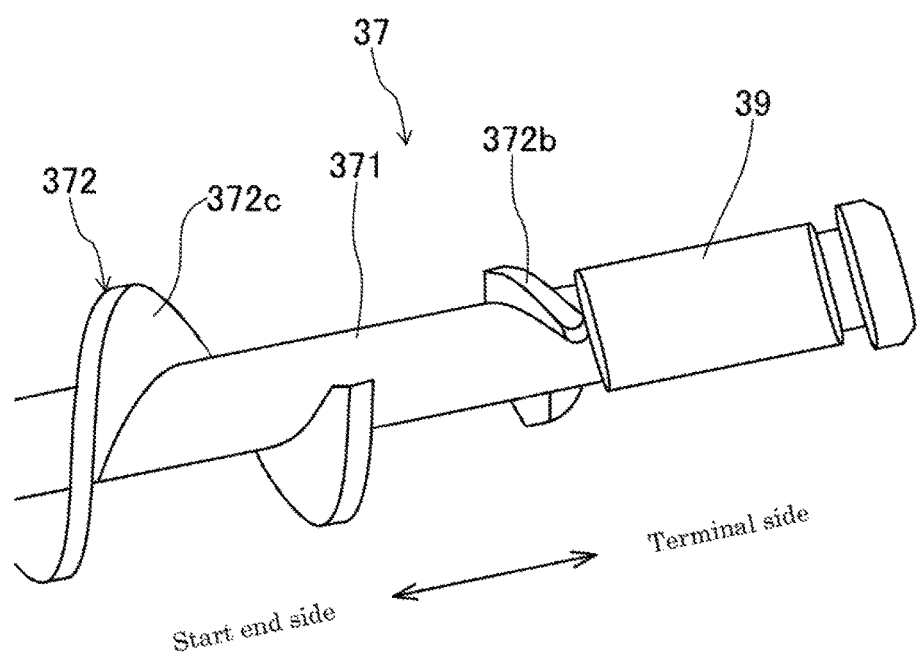
FIG. 5 is an enlarged perspective view illustrating a terminal part side of a toner conveying screw.

The aforementioned cleaning device 34 conveys toner of the surface of the intermediate transfer belt 7, which has been scrubbed by a cleaning roller 36, in a predetermined direction by the toner conveyance device 100. The toner conveyance device 100 has a casing 35, the cleaning roller 36, a conveying screw 37, and a pair of bearings 38a and 38b as illustrated in FIG. 2, FIG. 3A, and FIG. 3B.

The casing 35 is a resinous case member having a toner conveyance path 50, a gear receiving space 51, and a roller receiving space 52 therein. In the toner conveyance path 50, the conveying screw 37 is received. In the casing 35, a toner discharge port 35a (see FIG. 3B) opened downward is formed at a position near a terminal part of the toner conveyance path 50. The gear receiving space 51 is concatenated to a start end part side of the toner conveyance path 50. The gear receiving space 51 receives a gear 42 for driving the conveying screw 37 therein. The roller receiving space 52 receives the cleaning roller 36 therein.

The cleaning roller 36 includes a roller member extending in a rotation axis direction of the intermediate transfer belt 7. The cleaning roller 36 is exposed from an opening formed at a side surface of the casing 35, which faces the intermediate transfer belt 7 side, and contacts with the surface of the intermediate transfer belt 7. The cleaning roller 36 is rotated while being in contact with the surface of the intermediate transfer belt 7 thereby scraping toner off the surface. The toner scraped by the cleaning roller 36 falls from the roller receiving space 52 into the toner conveyance path 50 below the roller receiving space 52.

In the toner conveyance path 50, the conveying screw 37 is arranged in parallel to the cleaning roller 36. The conveying screw 37 conveys the toner scraped by the cleaning roller 36 from the start end part side to the terminal part side (to a back side from a front side of the sheet surface of FIG. 2 in the present embodiment) of the toner conveyance path 50, and discharges the toner downward from the toner discharge port 35a.

As illustrated in FIG. 3A and FIG. 3B, both ends of the conveying screw 37 in an axial direction are rotatably supported by the aforementioned pair of bearings 38a and 38b. The pair of bearings 38a and 38b, for example, are configured by sliding bearings. A cylindrical low friction member 39 is externally fitted to a place of the conveying screw 37 supported by the bearings 38a and 38b.

The pair of bearings 38a and 38b are respectively held to seal holders 41 together with oil seals (seal members) 40. The seal holder 41 has a cylindrical member 41a, a regulating plate 41c protruding radially inward from a distal end edge of the cylindrical member 41a, and a flange 41d protruding radially outward from a base end edge of the cylindrical member 41a. The pair of bearings 38a and 38b are inserted into the cylindrical members 41a in a state in which their flanges abut end surfaces of the cylindrical members 41a of the seal holders 41.

The oil seal 40 has a function of preventing infiltration of toner into the bearings 38a and 38b. The oil seal 40 has an annular shape in a whole view and a shaft 371 of the conveying screw 37 passes through a center hole of the oil seal 40. An outer peripheral surface of the oil seal 40 is tightly fitted to an inner peripheral surface of the cylindrical member 41a of the seal holder 41. A lip part of the oil seal 40 contacts with an outer peripheral surface of the aforementioned low friction member 39 in the conveying screw 37.

The aforementioned seal holder 41 holding the oil seal 40 is mounted at a cylindrical holder mounting member 35b. The holder mounting member 35b is provided at both ends of the toner conveyance path 50 of the casing 35. The holder mounting member 35b is integrally molded with a bottom wall part of the casing 35. In the mounting state of the seal holder 41, the cylindrical member 41a of the seal holder 41 is internally fitted to a base end side of the holder mounting member 35b and the flange 41d of the seal holder 41 abuts the end surface of the holder mounting member 35b. A space (a space positioned axially inward from the seal holder 41) of the holder mounting member 35b, which is adjacent to the seal holder 41, constitutes a start end-side cavity 53 (see FIG. 3A) and a terminal-side cavity 54 (see FIG. 3B).

The conveying screw 37 has a columnar shaft 371 and a spiral blade 372 protruding from a peripheral surface of the shaft 371. The spiral blade 372 has a spiral shape around a shaft line of the conveying screw 37.

The spiral blade 372 has a start end-side blade 372a, a terminal-side blade 372b, and an intermediate blade 372c. The start end-side blade 372a is adjacent to the bearing 38a (see FIG. 3A) positioned at the start end part side in the toner conveyance path 50. The terminal-side blade 372b is adjacent to the bearing 38b (see FIG. 3B) positioned at the terminal part side in the toner conveyance path 50. The intermediate blade 372c is formed between the start end-side blade 372a and the terminal-side blade 372b.

Both end positions of the intermediate blade 372c in a spiral axis direction coincide with both end positions (both end positions in a range in which the toner scrubbed by the cleaning roller 36 falls) of the intermediate transfer belt 7 in the spiral axis direction. The intermediate blade 372c is formed such that a blade diameter (a diameter of the blade when viewed from the spiral axis direction) in the spiral axis direction is constant.

The start end-side blade 372a is continuously connected to the intermediate blade 372c. The spiral winding directions of the start end-side blade 372a and the intermediate blade 372c are equal to each other. The number of spiral windings of the start end-side blade 372a is one in the present embodiment. The blade diameter of the start end-side blade 372a is gradually reduced from the intermediate blade 372c side toward the bearing 38a side in the spiral axis direction and finally reaches 0. The blade diameter of the start end-side blade 372a is smaller than that of the intermediate blade 372c. The start end-side blade 372a is positioned in the start end-side cavity 53 of the holder mounting member 35b, which is adjacent to the seal holder 41.

The terminal-side blade 372b is formed apart from the intermediate blade 372c by a predetermined interval. That is, between the terminal-side blade 372b and the intermediate blade 372c, a region Ro including only the shaft 371 is provided. The region Ro is positioned directly above the toner discharge port 35a. The spiral winding direction of the terminal-side blade 372b is opposite to that of the intermediate blade 372c. The number of spiral windings of the terminal-side blade 372b is one in the present embodiment. The blade diameter of the terminal-side blade 372b is gradually reduced from the intermediate blade 372c side toward the bearing 38b side in the spiral axis direction and finally reaches 0. The blade diameter of the terminal-side blade 372b is smaller than that of the intermediate blade 372c.

According to the toner conveyance device 100 configured as described above, toner scrapped by the cleaning roller 36 and fallen into the toner conveyance path 50 is conveyed from the start end part to the terminal part of the toner conveyance path 50 by the rotating conveying screw 37 and is discharged downward from the toner discharge port 35a.

The spiral blade 372 of the conveying screw 37 has the start end-side blade 372a adjacent to the bearing 38a positioned at the start end side and the terminal-side blade 372b adjacent to the bearing 38b positioned at the terminal side, the spiral winding direction of the start end-side blade 372a is equal to that of the intermediate blade 372c, and the spiral winding direction of the terminal-side blade 372b is opposite to that of the intermediate blade 372c. According to this, toner infiltrated into a area adjacent to the bearing 38a positioned at the start end side is conveyed in a forward direction (a side separated from the bearing 38a) by the start end-side blade 372a, and toner infiltrated into an area adjacent to the bearing 38b positioned at the terminal side is conveyed in a direction (a side separated from the bearing 38b) opposite to the forward direction by the terminal-side blade 372b. Thus, it is possible to prevent toner from infiltrating into the bearings 38a and 38b, and to prevent toner from being accumulated in spaces (that is, the start end-side cavity 53 and the terminal-side cavity 54) adjacent to the bearings 38a and 38b. Consequently, it is possible to avoid accumulated toner from being melted by frictional heat due to the rotation of the conveying screw 37.

Furthermore, the blade diameter of the start end-side blade 372a and the blade diameter of the terminal-side blade 372b are smaller than that of the intermediate blade 372c. In this way, a gap between an inner peripheral surface of the start end-side cavity 53 and an outer end in a radial direction of the start end-side blade 372a and a gap between an inner peripheral surface of the terminal-side cavity 54 and an outer end in the radial direction of the terminal-side blade 372b can be allowed to be larger than a gap between an inner peripheral surface of the toner conveyance path 50 and an outer end in the radial direction of the intermediate blade 372c. Thus, it is possible to prevent toner from staying in a gap between a distal end of the start end-side blade 372a and the inner peripheral surface of the start end-side cavity 53 and a gap between a distal end of the terminal-side blade 372b and the inner peripheral surface of the terminal-side cavity 54.

Furthermore, the annular oil seals (the seal members) 40 are provided between the bearing 38a and the start end-side blade 372a, and between the bearing 38b and the terminal-side blade 372b, thereby preventing infiltration of toner into the bearings 38a and 38b. In this way, it is possible to prevent the infiltration of toner into the bearings 38a and 38b by the oil seals 40 without providing a flange and the like to the shaft 371 of the conveying screw 37.

The oil seals 40 are held by the seal holder 41, and maximum blade diameters of the start end-side blade 372a and the terminal-side blade 372b are allowed to be smaller than a hole diameter of a through hole 41b of the regulating plate 41c of the seal holder 41.

According to this, even when the conveying screw 37 is allowed to be supported by the pair of bearings 38a and 38b with a gap in the axial direction, the start end-side blade 372a and the terminal-side blade 372b do not interfere with the regulating plate 41c of the seal holder 41. Thus, the start end-side blade 372a and the terminal-side blade 372b can be allowed to be brought close to the bearings 38a and 38b, so that it is possible to avoid the occurrence of a dead space having no toner conveyance ability in the vicinity of the bearings 38a and 38b. Consequently, it is possible to suppress staying of toner in the vicinity of the bearings 38a and 38b as much as possible.

Furthermore, the start end-side blade 372a and the terminal-side blade 372b of the conveying screw 37 are positioned outward from a range (positions corresponding to both end positions of the intermediate transfer belt 7 in the present embodiment) in which toner falls in the toner conveyance path 50.

In this way, it is possible to maximally avoid the occurrence of the dead space having no toner conveyance ability in the vicinity of the bearings 38a and 38b in the toner conveyance path 50.

Furthermore, toner used in the present embodiment is low melt toner. In the case of using the low melt toner, since the problem of fusion of toner to the conveying screw 37 or the inner peripheral surface of the toner conveyance path 50 due to the aforementioned toner staying easily occurs, employing the technology of the present disclosure is particularly useful for solving the problem.

Other Embodiments

In the aforementioned embodiment, the toner conveyance device 100 installed at the cleaning device 34 of the intermediate transfer belt 7 has been described as an example; however, the technology of the present disclosure is not limited thereto. That is, the technology configuration of the present disclosure, for example, can also be applied to a toner conveyance device installed at the developing unit 33.

In the aforementioned embodiment, the number of spiral windings of the start end-side blade 372a and the number of spiral windings of the terminal-side blade 372b are one; however, the technology of the present disclosure is not limited thereto and for example, the number of spiral windings may be two or more or may be equal to or less than one (for example, ½ winding).

In the aforementioned embodiment, the low melt toner is used as an example; however, toner having a normal melting point may also be used.

What is claimed is:

1. A toner conveyance device comprising:
a casing which forms a toner conveyance path therein and has a toner discharge port opened downward at a position near a terminal part of the toner conveyance path;
a pair of bearings; and
a conveying screw which includes a shaft having both ends supported by the pair of bearings, and a spiral blade protruding from a peripheral surface of the shaft in a spiral shape, and conveys toner in the toner conveyance path from a start end part to the terminal part of the toner conveyance path by rotating in a predetermined direction,
wherein the spiral blade includes a start end-side blade adjacent to the bearing positioned at a start end part side in the toner conveyance path, a terminal-side blade adjacent to the bearing positioned at a terminal side in the toner conveyance path, and an intermediate blade formed between the start end-side blade and the terminal-side blade,
the toner discharge port is provided between the intermediate blade and the terminal-side blade,
a spiral winding direction of the terminal-side blade is opposite to a spiral winding direction of the intermediate blade,
a spiral winding direction of the start end-side blade is equal to the spiral winding direction of the intermediate blade, and
a blade diameter of the start end-side blade and a blade diameter of the terminal-side blade are smaller than a blade diameter of the intermediate blade.

2. The toner conveyance device of claim 1,
wherein, in the toner conveyance path, a start end-side cavity and a terminal-side cavity are formed to respectively receive the start end-side blade and the terminal-side blade, and
a gap between an inner peripheral surface of the start end-side cavity and an outer end in a radial direction of the start end-side blade and a gap between an inner peripheral surface of the terminal-side cavity and an outer end in the radial direction of the terminal-side blade are larger than a gap between an inner peripheral surface of the toner conveyance path and an outer end in the radial direction of the intermediate blade.

3. The toner conveyance device of claim 1, further comprising:
annular seal members respectively provided between the pair of bearings and the spiral blade to prevent infiltration of toner into the bearings; and
seal holders which hold the seal members,
wherein each of the seal holders includes a cylindrical member having an inner peripheral surface to which the seal member is fitted, and a regulating plate having a through hole through which the shaft passes and abutting an end surface of the seal member, and
maximum blade diameters of the start end-side blade and the terminal-side blade are smaller than a hole diameter of the through hole formed in the regulating plate of the seal holder.

4. The toner conveyance device of claim 1,
wherein the start end-side blade and the terminal-side blade are positioned outward from a range in which toner falls in the toner conveyance path.

5. The toner conveyance device of claim 1,
wherein the toner is low melt toner.

6. An image forming apparatus including the toner conveyance device of claim 1.

* * * * *